US008512203B2

(12) United States Patent
Raasch et al.

(10) Patent No.: US 8,512,203 B2

(45) **Date of Patent: *Aug. 20, 2013**

(54) GENERATOR SET

(75) Inventors: Jason Raasch, Cedarburg, WI (US); Robert Carlson, Hudson, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,637

(22) Filed: Sep. 13, 2012

(65) Prior Publication Data

US 2013/0005522 A1 Jan. 3, 2013

Related U.S. Application Data

(63) Continuation of application No. 12/404,808, filed on Mar. 16, 2009, now Pat. No. 8,267,835.

(60) Provisional application No. 61/037,388, filed on Mar. 18, 2008.

(51) Int. Cl.
*F16H 61/662* (2006.01)

(52) U.S. Cl.
USPC ........................................................... 477/44

(58) Field of Classification Search
None
See application file for complete search history.

(56) References Cited

U.S. PATENT DOCUMENTS

| | | | |
|---|---|---|---|
| 2,678,566 | A | 5/1954 | Oehrli |
| 4,278,928 | A | 7/1981 | Griffiths et al. |
| 4,539,000 | A | 9/1985 | Gayer |
| 4,649,486 | A | 3/1987 | Oshiage |
| 4,651,082 | A | 3/1987 | Kaneyuki |
| 4,699,025 | A | 10/1987 | Omitsu |
| 4,700,590 | A | 10/1987 | Omitsu |
| 4,733,155 | A | 3/1988 | Smith |
| 4,824,419 | A | 4/1989 | Kumm |
| 4,925,432 | A | 5/1990 | Miyamaru et al. |
| 4,969,857 | A | 11/1990 | Kumm |
| 4,991,400 | A | 2/1991 | Wilkinson |
| 5,539,258 | A | 7/1996 | Sutton et al. |
| 6,017,285 | A | 1/2000 | Yasuhara et al. |
| 6,099,424 | A | 8/2000 | Tsai et al. |
| 6,129,643 | A | 10/2000 | Tamagawa et al. |
| 6,179,739 | B1 | 1/2001 | Tsai et al. |
| 6,290,620 | B1 | 9/2001 | Tsai et al. |
| 6,618,275 | B2 | 9/2003 | Suzuki et al. |

(Continued)

OTHER PUBLICATIONS

Memmer, Scott, "CVT Enters the Mainstream," edmunds.com webpages, 3 pages, Retrieved on Mar. 3, 2008 from http:///www.edmunds.com/ownership/techcenter/articles/45104/article.html.

(Continued)

*Primary Examiner* — Erin D Bishop
(74) *Attorney, Agent, or Firm* — Michael Best & Friedrich LLP

(57) ABSTRACT

A generator system includes a prime mover having a drive shaft and a throttle, a driven member having a rotor disposed on a rotor shaft, and a continuously variable transmission pulley system. The transmission pulley system includes a drive pulley coupled to the drive shaft and having a variable drive pulley effective diameter. A driven pulley coupled to the rotor shaft has a variable driven pulley effective diameter responsive to varying torque on the rotor shaft. A belt configured to engage the drive pulley and the driven pulley has a belt tension, wherein the drive pulley effective diameter varies in response to the belt tension.

20 Claims, 7 Drawing Sheets

(56) References Cited

U.S. PATENT DOCUMENTS

| | | | |
|---|---|---|---|
| 6,672,981 | B2 | 1/2004 | Inoue et al. |
| 2004/0040533 | A1 | 3/2004 | Laimboeck |
| 2005/0153805 | A1 | 7/2005 | Koyama |
| 2005/0233846 | A1 | 10/2005 | Green et al. |
| 2008/0047753 | A1 | 2/2008 | Hall et al. |

OTHER PUBLICATIONS

Gates Corporation, "How does the clutch system work?" online brochure, 7 pages, Retrieved on Mar. 6, 2008 from http://www.gates.com/brochure.cfm?brochure=1033&location_id=542.

Longhurst, Chris, "The transmission bible" webpages, Feb. 14, 2008, 46 pages, Retrieved on Mar. 3, 2008 from http:///www.carbibles.com/transmission_bible.html.

GENERATOR SET

CROSS REFERENCE TO RELATED APPLICATIONS

This application is a continuation of U.S. patent application Ser. No. 12/404,808, filed Mar. 16, 2009, now U.S. Pat. No. 8,267,835, which claims priority to U.S. Provisional Patent Application No. 61/037,388, filed Mar. 18, 2008, the entire contents of all of which are incorporated herein by reference.

BACKGROUND

The present invention relates to a transmission and governor for a portable, residential, or small business generator system.

Typical generator systems employ direct drive transmissions to couple an engine to an alternator. Direct drive systems typically fix the engine speed at 3,000 rpm (50 Hz) or 3,600 rpm (60 Hz), depending upon the required output current frequency. Due to the nature of direct drive transmission, such systems are inefficient and excessively noisy during low load operation. Some generator systems employ an inverter to allow the engine to operate at speeds that are proportionate to the power demand. A generator is rotated at a variable speed and its output is converted into direct current. Then, the inverter creates a sinusoidal output from the direct current at the desired output voltage and frequency (e.g., 120 VAC, 60 Hz). However, inverters are complex and expensive.

SUMMARY

In one embodiment, the invention provides a generator system for a portable, residential or small business generator including an engine, an alternator, a continuously variable transmission pulley system and a governor. The engine includes a drive shaft and a throttle. The alternator includes a rotor disposed on a rotor shaft. The continuously variable transmission pulley system includes a drive pulley coupled to the drive shaft, a driven pulley coupled to the rotor shaft, and a belt configured to engage the drive pulley and the driven pulley. The governor adjusts the engine throttle to control the speed of the engine in response to a speed of the rotor shaft.

In another embodiment the invention provides a continuously variable transmission pulley system for a generator, including a drive pulley having a first sheave and a second sheave, a driven pulley having a third sheave and a fourth sheave, and a belt that engages the drive pulley and the driven pulley. The belt is disposed between the first sheave and the second sheave, and between the third sheave and the fourth sheave. The driven pulley is configured to open and close to change a diameter of the belt disposed between the third sheave and the fourth sheave in response to a load on the generator.

In another embodiment, the invention provides a method of controlling a generator having an engine, an engine throttle, and an alternator, the alternator having a rotor and a rotor shaft and the engine having a drive shaft. The method includes coupling the drive shaft of the engine to the rotor shaft of the alternator such that a rotational speed of the rotor shaft is capable of being different than a rotational speed of the drive shaft, adjusting a ratio of rotor shaft speed to drive shaft speed in response to a torque on the rotor shaft, and maintaining a substantially constant rotor shaft speed.

In another embodiment, the invention provides a generator system including a prime mover having a drive shaft and a throttle, a driven member having a rotor disposed on a rotor shaft, and a continuously variable transmission pulley system. The transmission pulley system includes a drive pulley coupled to the drive shaft and having a variable drive pulley effective diameter. A driven pulley coupled to the rotor shaft has a variable driven pulley effective diameter responsive to varying torque on the rotor shaft. A belt configured to engage the drive pulley and the driven pulley has a belt tension, wherein the drive pulley effective diameter varies in response to the belt tension.

In another embodiment, the invention provides a generator system including a prime mover having a drive shaft and a throttle, a driven member having a rotor disposed on a rotor shaft, and a continuously variable transmission pulley system. The transmission pulley system includes a drive pulley coupled to the drive shaft and having a variable drive pulley effective diameter. A driven pulley coupled to the rotor shaft has a variable driven pulley effective diameter responsive to varying torque on the rotor shaft. A belt is configured to engage the drive pulley and the driven pulley. A governor is configured to adjust the throttle to control the speed of the engine in response to a speed of the rotor shaft.

In another embodiment, the invention provides a method of controlling the operation of a generator having a driven shaft. The method includes coupling a driven pulley to the driven shaft, the driven pulley having a variable effective diameter. The method further includes providing a prime mover having a drive shaft and coupling a drive pulley to the drive shaft, the drive pulley having a variable effective diameter. The method also includes engaging a belt with the drive pulley and the driven pulley such that the driven shaft rotates in response to rotation of the drive shaft, the belt having a belt tension. The method additionally includes adjusting the effective diameter of the driven pulley in response to varying torque on the driven shaft and adjusting the effective diameter of the drive pulley in response to variations in the belt tension.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
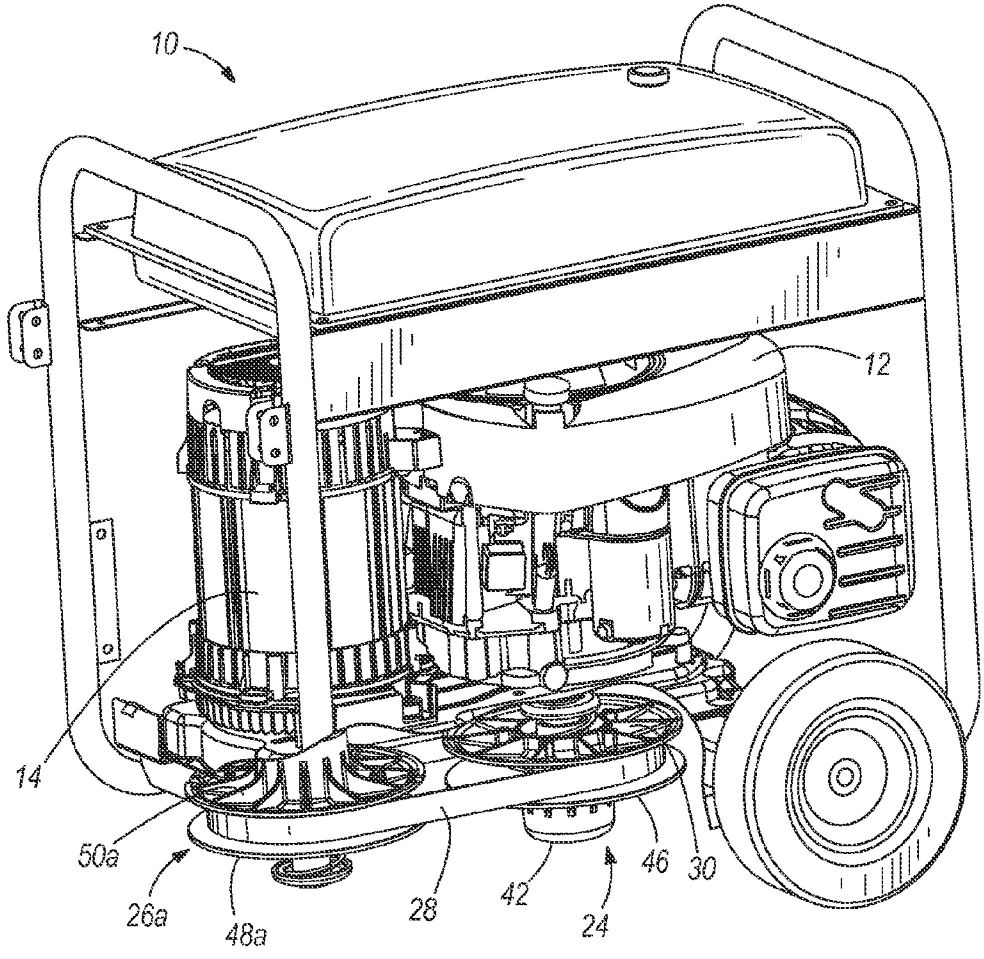
FIG. 1 is a perspective view of a generator system according to the invention having one construction of a driven pulley in a continuously variable transmission (CVT) pulley system.
Figure 4:
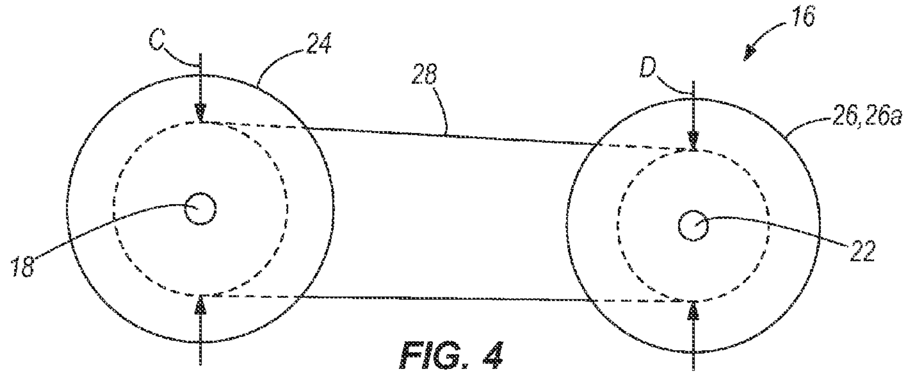
FIG. 4 is a schematic view of the CVT pulley system according to the invention.
Figure 2:
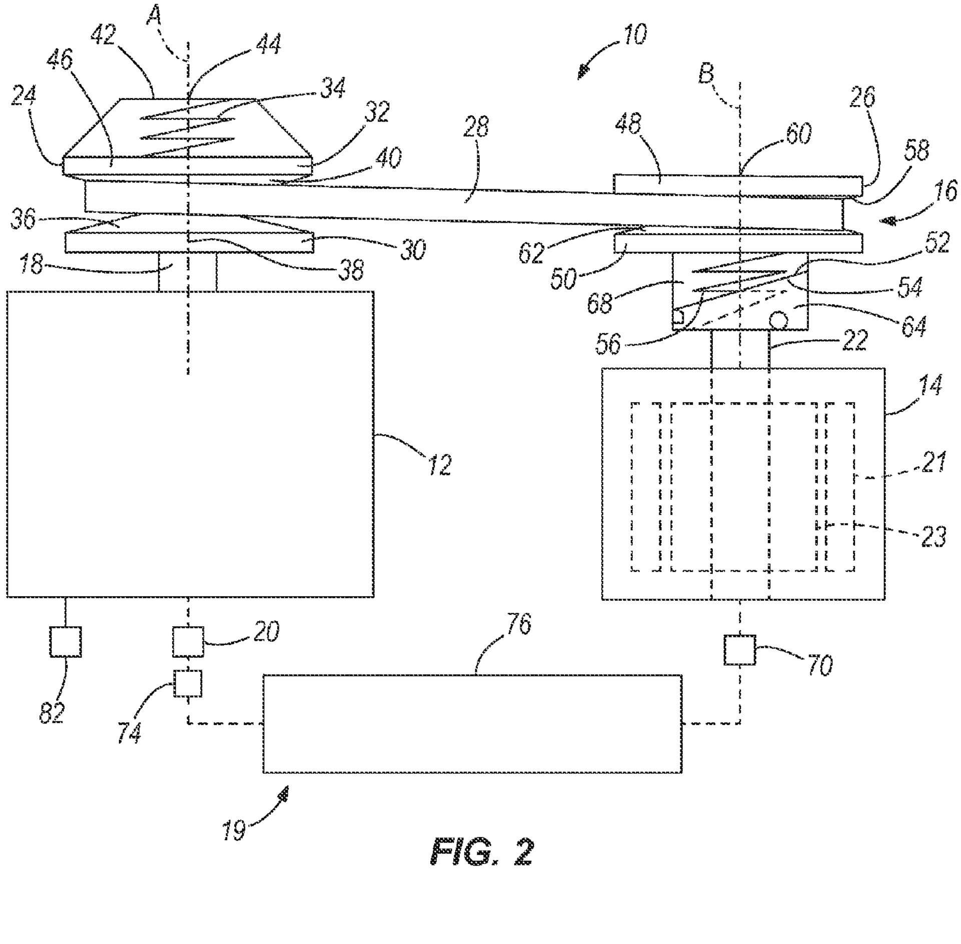
FIG. 2 is a schematic view of the generator system of FIG. 1 having another construction of a driven pulley in the CVT pulley system.

FIGS. 1-2 illustrate a portable generator 10 having an engine 12, an alternator 14, a continuously variable transmission (CVT) pulley system 16 and a governor 19. The generator 10 converts engine rotation into electrical power to supply power-consuming devices or loads (not shown) electrically connected to the generator's output. The connected loads require electrical power within narrow voltage and frequency ranges, such as plus-or-minus five percent. The magnitude of the total electrical load depends on the type and number of power-consuming devices drawing power from the generator 10. In the illustrated construction, the engine 12 and alternator 14 are positioned side-by-side. In another construction, the engine 12 and alternator 14 may be positioned one on top of the other, facing each other, or the like. The generator 10, as described herein, could also be configured for use as a residential or small business generator and is not limited to portable generators.

In the illustrated construction, the engine 12 is an air-cooled internal combustion gasoline engine having a drive shaft 18 preferably delivering an output of between 2 and 45 horsepower (hp) and preferably operating at a speed range of between 200 rpm and 4000 rpm, with speeds of between about 1,500 rpm and 3,800 rpm being preferred for spark-ignition internal combustion engines. The speed of the engine 12 is controlled by a throttle 20. The drive shaft 18 has a central axis A. In other constructions, the engine 12 may deliver an output more than 45 hp. Other constructions may also employ fuels such as diesel, propane, natural gas, and the like. Such engines may run at speeds as low as 200 rpm.

In the illustrated construction, with reference particularly to FIG. 2, the alternator 14 is a conventional single-phase alternating current (AC) generator having a stator 21, a rotor 23 and a rotor shaft 22, as is well known in the art. The total electrical load on the generator 10 is felt by the alternator 14 as a torque on the rotor shaft 22. The rotor shaft 22 has a central axis B. In order to provide steady alternating current having a substantially constant frequency, the alternator 14 must substantially maintain a target rotor speed. In the preferred construction, the target rotor speed is approximately 3600 rpm. A tolerance of approximately plus or minus five percent is preferred, but larger tolerances are possible. In other constructions, the alternator 14 may have a target rotor speed of about 3000 rpm to generate 220 volts, 50 Hz alternating current to power loads in Europe, for example.

As shown in FIGS. 1-5, the CVT pulley system 16 includes a drive pulley 24, a driven pulley 26, and a belt 28 disposed between and engaging the drive pulley 24 and the driven pulley 26. (An alternative construction of the driven pulley 26 is shown as 26*a* in FIGS. 1, 3 and 5 and will be explained in greater detail below. All description of the driven pulley 26 can be applied to the construction of 26*a*, except as explained below.) In the illustrated constructions of FIGS. 1-5, the drive pulley 24 and the driven pulley 26, 26*a* are variable diameter pulleys and the belt 28 is a conventional V-belt having a tapered width to adjust to varying diameters of the drive and driven pulleys 24, 26, 26*a*. The drive pulley 24 has a spring-loaded variable diameter and the driven pulley 26, 26*a* has a torque-sensitive variable diameter, as will be explained in greater detail below. The effective diameter of a pulley at any given point in time is equal to two times the pitch radius of the belt 28 that engages the pulley. The belt pitch radius is the radial distance from the pulley axis of rotation to embedded tensile cords within the belt construction. Each pulley has a minimum and a maximum possible effective diameter, which depends upon the geometry of the pulley, and the effective diameter may have a value anywhere between the minimum and the maximum possible effective diameter. The geometry of the pulleys will be described in greater detail below.

With reference to FIG. 2, the drive pulley 24 is coupled to the drive shaft 18 of the engine 12. The driven pulley 26 is coupled to the rotor shaft 22 of the alternator 14. The CVT pulley system 16 connects the drive shaft 18 to the rotor shaft 22, so the alternator 14 is effectively driven by, or in response to, the engine 12. In the illustrated construction of FIG. 3, the axes A and B are spaced apart by a first distance E, preferably about 12 inches. The outermost length between the outer circumference of the drive pulley 24 is a second distance F, preferably about 21.5 inches. The depth of the drive pulley 24 is a third distance G, preferably about 5.9 inches. The offset between portions of the drive and driven pulleys 24, 26, 26*a* closest to the engine 12 and alternator 14, respectively, is a fourth distance H, preferably about 0.8 inches. In other constructions, these distances will vary depending on the pulleys used, the size of the generator, etc. It is to be understood that these dimensions are not meant to limit the scope of the invention, and other suitable dimensions are possible.

With reference to FIG. 2, the drive pulley 24 includes a first sheave 30, a second sheave 32, and an axial spring 34. The first sheave 30 has a first inclined, or curved, surface 36 on which a portion of the belt 28 rides. The first sheave 30 is coupled to the drive shaft 18 of the engine 12 and rotates with the drive shaft 18. The first sheave 30 is axially fixed to the drive shaft 18 at a first location 38 along the axis A. The second sheave 32 has a second inclined, or curved, surface 40 on which another portion of the belt 28 rides. The second surface 40 faces the first surface 36, and the belt 28 is disposed between the first surface 36 and the second surface 40. The second sheave 32 is coupled to the drive shaft 18 and rotates with the drive shaft 18. A fixed portion 42 of the second sheave is axially fixed to the drive shaft 18 at a second location 44 along the axis A. A moveable portion 46 of the second sheave includes the second surface 40 and is moveable along the axis A between the first location 38 and the second location 44. The moveable portion 46 translates axially and rotates with the drive shaft 18. The axial spring 34 is a compression spring coupled to the moveable portion 46 of the second sheave at one end and coupled to the fixed portion 42 of the second sheave at another end. The axial spring 34 biases the moveable portion 46 of the second sheave toward the first sheave 30. Therefore, the second surface 40 is biased toward the first surface 36. It should be noted that the second sheave 32 remains axially and radially aligned with the first sheave 30 as the second sheave 32 moves with respect to the first sheave 30. The maximum effective diameter of the drive pulley occurs when the first and second surfaces are as close together as possible. In this condition, the belt 28 rides high on the drive pulley 24 and has a large diameter where the belt 28 engages the drive pulley 24. In the illustrated construction, the first sheave 30 is disposed between the second sheave 32 and the engine 12. It is to be understood that in another construction, the second sheave 32 may be disposed between the first sheave 30 and the engine 12.

Figure 2A:
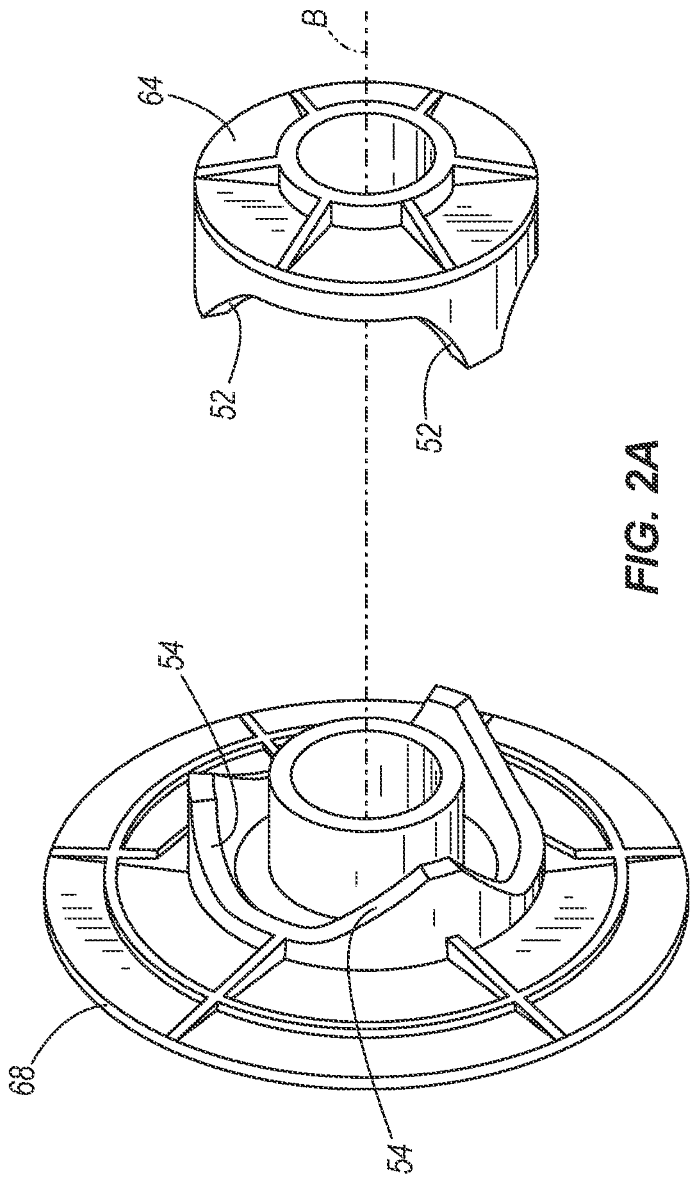
FIG. 2A is a detailed view of a portion of the driven pulley of FIG. 2.
Figure 3:
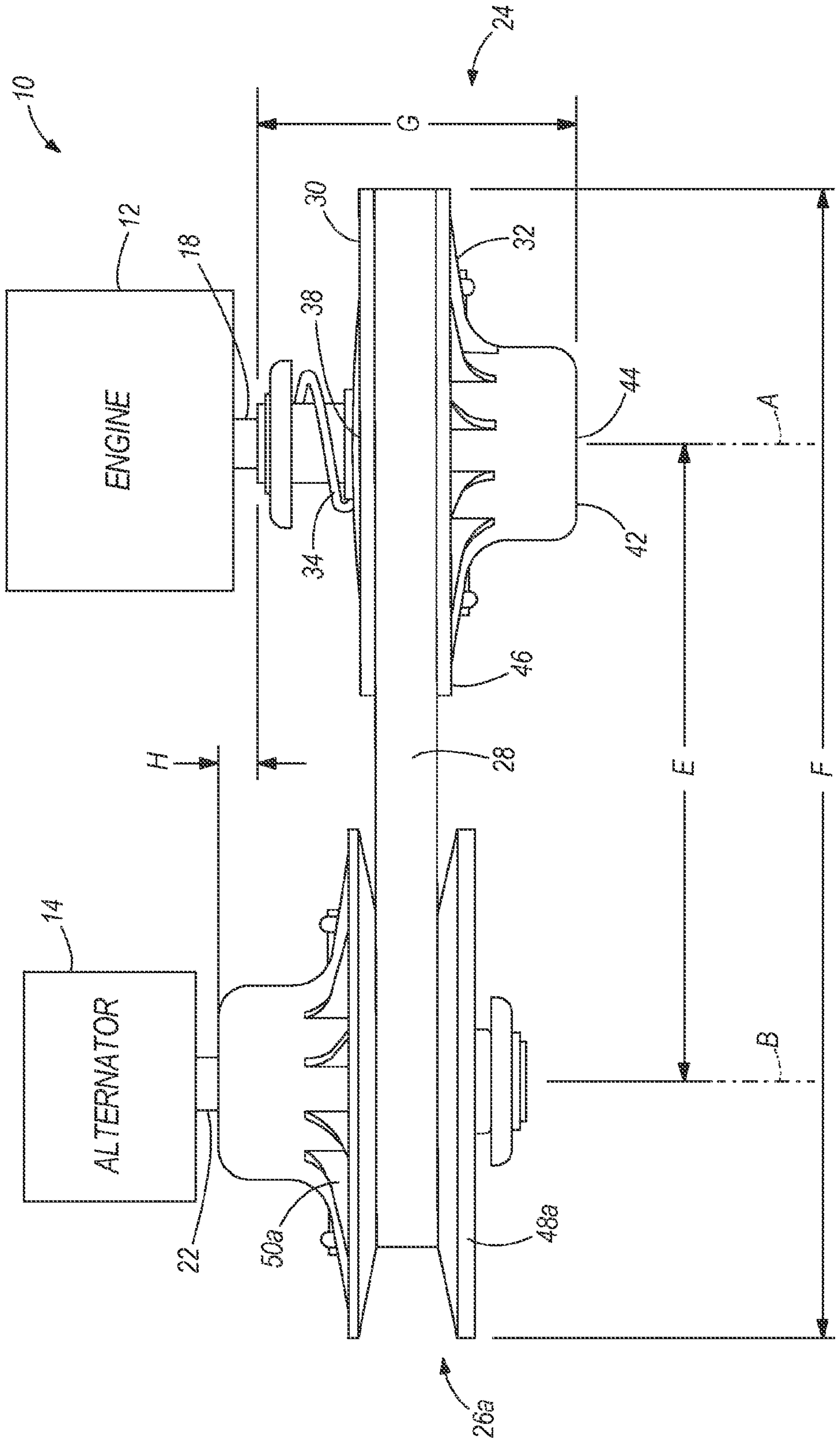
FIG. 3 is another schematic view of the generator system of FIG. 1 showing the continuously variable transmission (CVT) pulley system in greater detail.

As shown in the construction of FIG. 2, the driven pulley 26 includes a third sheave 48, a fourth sheave 50, a first cam surface 52, a second cam surface 54, and a torsional spring 56. The first and second cam surfaces 52, 54 are shown in detail in FIG. 2A. The third sheave 48 has a third inclined, or curved, surface 58 on which a portion of the belt 28 rides. The third sheave 48 is coupled to the rotor shaft 22 of the alternator 14 and rotates with the rotor shaft 22. The third sheave 48 is axially fixed to the rotor shaft at a first location 60 along the axis B. The fourth sheave 50 has a fourth inclined, or curved, surface 62 on which a portion of the belt 28 rides. The fourth surface 62 faces the third surface 58, and the belt 28 is disposed between the fourth surface 62 and the third surface 58. The fourth sheave 50 is coupled to the rotor shaft 22 of the alternator 14 and rotates with the rotor shaft 22. A fixed portion 64 of the fourth sheave is axially fixed to the rotor shaft 22 at a second axial location 66 along the axis B.

With further reference to FIG. 2, the fixed portion 64 of the fourth sheave includes the first cam surface 52, or first ramp, and a moveable portion 68 of the fourth sheave includes the second cam surface 54, or second ramp, that is in opposition to and in contact with the first cam surface 52. The second cam surface 54 is configured to follow the first cam surface 52 as the second cam surface 54 rotates with respect to the first cam surface 52. The first cam surface 52 acts as a wedge, so the moveable portion 68 of the fourth sheave moves axially away from the fixed portion 64 of the fourth sheave when the moveable portion 68 rotates in a first direction relative to the fixed portion 64. Accordingly, the moveable portion 68 moves axially towards the fixed portion 64 when the moveable portion 68 rotates in a second direction relative to the fixed portion 64. It is to be understood that the first cam surface 52 and the second cam surface 54 may have many different geometries to achieve various desired effects as the second cam surface rotates with respect to the first cam surface, and may include roller-type followers and the like to reduce the coefficient of friction between the first and second cam surfaces 52, 54. Generally, the first cam surface 52 and the second cam surface 54 form a helical cam, as is understood by those skilled in the art. One suitable drive pulley assembly is a model 340 torque converter made by Hoffco.

With reference to FIG. 2, the fixed portion 64 of the fourth sheave is coupled to the moveable portion 68 of the fourth sheave by way of the torsional spring 56. The torsional spring 56 biases the moveable portion 68 of the fourth sheave toward the third sheave 48. Therefore, with the belt 28 removed, the fourth surface 62 is biased toward the third surface 58. It should be noted that the third sheave 48 and the fourth sheave 50 remain axially aligned as the fourth sheave 50 moves with respect to the third sheave 48. However, the third sheave 48 and fourth sheave 50 change their radial alignment relative to one another as the fourth sheave 50 moves axially with respect to the third sheave 48. In the illustrated construction, the fourth sheave 50 is disposed between the third sheave 48 and the alternator 14. It is to be understood that in another construction, the third sheave 48 may be disposed between the fourth sheave 50 and the alternator 14.

Figure 5:
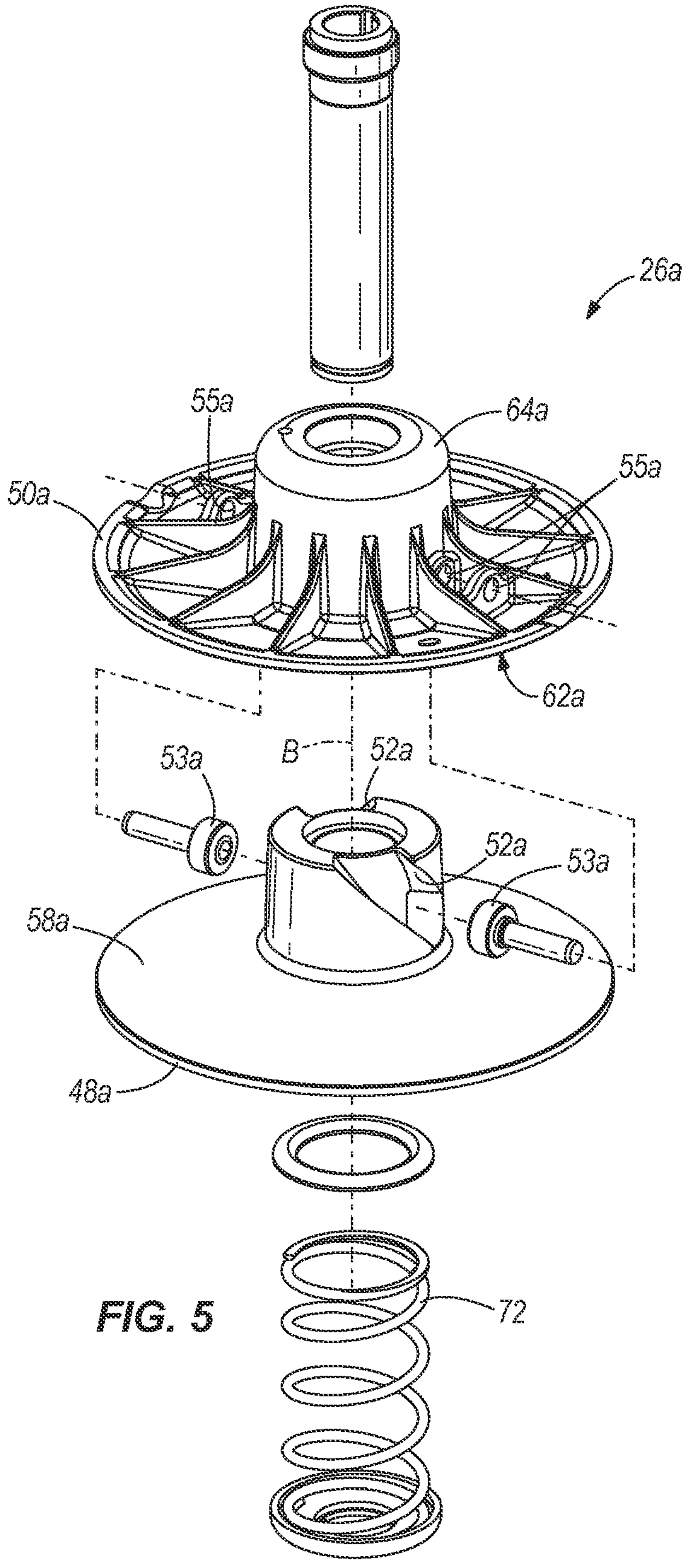
FIG. 5 is an exploded view of the driven pulley of FIGS. 1 and 3.

In another construction of the driven pulley, referred to with the numeral 26*a* and shown in FIG. 5, the torsional spring 56 can be replaced with an axial spring 72 that biases the third and fourth sheaves 48, 50 closed. In this construction, the driven pulley 26*a* includes a fifth sheave 48*a*, a sixth sheave 50*a*, a helical groove 52*a*, a pair of rollers 53*a*, and the axial spring 72. The fifth sheave 48*a* has a fifth inclined, or curved, surface 58*a* on which a portion of the belt 28 rides. The fifth sheave 48*a* is coupled to the rotor shaft 22 of the alternator 14 and rotates with the rotor shaft 22. The fifth sheave 48*a* is axially fixed to the rotor shaft 22 at a location along the axis B. The sixth sheave 50*a* has a sixth inclined, or curved, surface 62*a* on which a portion of the belt 28 rides. The sixth surface 62*a* faces the fifth surface 58*a*, and the belt 28 is disposed between the sixth surface 62*a* and the fifth surface 58*a*. The sixth sheave 50*a* includes a pair of rollers 53*a* coupled thereto, such as by way of apertures 55*a*. The rollers 53*a* are sized to fit within the helical groove 52*a* and engage the helical groove 52*a*. Rolling of the rollers 53*a* within the helical groove 52*a* results in axial and radial translation of the sixth sheave 50*a* with respect to the fifth sheave 48*a*. This construction of the driven pulley 26*a* behaves substantially the same way as the first construction of the driven pulley 26 in response to torque on the rotor shaft 22, except that the structure is slightly different. It is, therefore, to be understood that there are other possible constructions of the CVT pulley system 16 that carry out substantially the same function while being configured differently.

With reference to FIG. 2, the governor 19 mechanically or electrically couples the rotor shaft 22 to the engine throttle 20. In a preferred construction, the governor 19 is an electronic governor to achieve a faster response time than a typical mechanical governor. The governor, denoted generally as 19, is preferably electronic and includes an rpm sensor 70 on the alternator rotor shaft 22, a throttle actuator 74, and an electronic control unit (ECU) 76. One suitable ECU is a Woodward APECS 500 single speed electronic engine controller. The rpm sensor 70 is electrically connected to an input of the ECU 76 to transmit a signal at least once per rotor revolution. In a preferred construction, the rpm sensor 70 includes a stationary permanent magnet and generates a signal with the passing of each tooth on a toothed wheel coupled to the rotor shaft 22. In another construction, the rpm sensor 70 includes a toothed wheel, or other rotatable magnet carrier, coupled to the rotor shaft 22, the toothed wheel having one or more permanent magnets coupled thereto. A permanent magnet sensor is disposed radially from the rotor shaft 22 and generates a pulse each time the one or more permanent magnets on the toothed wheel pass a fixed coil that is part of the magnet sensor. This construction, however, does not generate as high a resolution as the aforementioned construction of the rpm sensor. The ECU 76 is electrically connected to the throttle actuator 74 to provide control signals to the throttle actuator 74. The throttle actuator 74 is preferably a pulse width modulated spring-biased rotary actuator, but a stepper motor could be used. The actuator 74 controls the position of the throttle 20, and therefore the speed of the engine 12. The ECU 76 is programmed to maintain the target rotor speed, as described above. When the rotor speed drops significantly below the target rotor speed, as sensed by the rpm sensor 70, the ECU 76 commands the throttle actuator 74 to increase the speed of the engine 12 by moving the throttle valve toward the wide open position. Conversely, when the rotor speed increases above the target rotor speed, as sensed by the rpm sensor 70, the ECU 76 commands the throttle actuator 74 to decrease the speed of the engine 12 by moving the engine throttle valve toward the closed position. In other constructions, a different type of rpm sensor may be employed. Furthermore, a different type of governor that achieves the desired control may be employed.

For example, in another construction, the governor 19 may be mechanical. In this construction (not shown), the engine 12 preferably also has a carburetor and a carburetor throttle valve to control the air/fuel mixture and therefore the speed of the engine 12. A mechanical governor uses a control linkage from the rotor shaft or the driven pulley to the throttle valve to increase the engine speed when the rotor speed significantly drops below the target rotor speed, or to decrease the engine speed when the rotor speed is significantly above the target rotor speed.

Referring again to FIG. 2, an engine rpm limiter, or shutdown switch, 82 may be mechanically or electrically coupled to the engine ignition (not shown) and includes an engine speed sensor. The shutdown switch 82 may be disposed within an engine ignition coil. In the event of a broken or malfunctioning belt 28, the rotor shaft speed may decrease, causing the ECU 76 to increase the speed of the engine 12. If the belt 28 fails to transmit rotation of the drive shaft 18 into rotation of the rotor shaft 22, the governor 19 could continue to increase the engine speed without causing a subsequent rotor speed increase. In this situation, the rpm limiter or shutdown switch 82 grounds the ignition pulses when an excessive engine speed is detected, preventing the engine 12 from reaching an excessive speed in the event of a malfunction.

In operation, the driven pulley 26 is a torque-sensitive pulley that increases in effective diameter as torque on the rotor shaft 22 increases. While the belt 28 is removed (and the driven pulley 26 is not in operation) the third sheave 48 and the fourth sheave 50 (or the fifth sheave 48*a* and sixth sheave 50*a* in the construction of FIG. 5) are as close to each other as possible because of the biasing force of the torsional spring 56 (or the axial spring 72 in the construction of FIG. 5). During operation with the belt 28 in place, however, the moveable portion 68 of the fourth sheave (or the sixth sheave 50*a*) is forced away from the third sheave 48 against the biasing force of the torsional spring 56 (or axial spring 72) by belt tension. Increases in torque, or load, on the rotor shaft 22 act with the force of the torsional spring 56 (or axial spring 72) to force the inclined surfaces 58 (or 58*a*), 62 (or 62*a*) together to increase the effective diameter of the driven pulley 26 (or 26*a*). As the moveable portion 68 of the fourth sheave (or the sixth sheave 50*a*) rotates relative to the fixed portion 64 of the fourth sheave (or the fifth sheave 48*a*), the second cam surface 54 rides up on the first cam surface 52 as described above (or the rollers 53*a* ride in the helical groove 52*a*), thus closing the gap between moveable portion 68 of the fourth sheave (or the sixth sheave 50*a*) and the third sheave 48 (or the fifth sheave 48*a*), which increases the effective diameter of the driven pulley 26 (or 26*a*). The driven pulley 26 (or 26*a*) "demands" more belt from the drive pulley 24. The rate of effective diameter increase of the driven pulley 26 (or 26*a*) with respect to torque depends upon the geometry of the first cam surface 52 and the second cam surface 54 (or the helical groove 52*a*), as described above.

The drive pulley 24 acts as a belt-tensioner. In response to changes in effective diameter of the driven pulley 26, 26*a* and therefore changes in belt tension, the drive pulley 24 changes effective diameter to take up slack or to provide slack in order to maintain an acceptable level of tension in the belt 28. If there is not enough tension in the belt 28, the belt 28 may slip or fail to engage one or both of the pulleys 24, 26, 26*a* thereby decreasing the efficiency of the system 10. If there is too much tension in the belt 28, the belt 28 may wear more quickly and be prone to failure. For example, when the load on the alternator 14 increases, the torque on the rotor shaft 22 increases, and therefore the effective diameter of the driven pulley 26, 26*a* increases and the tension in the belt 28 increases. The extra tension in the belt 28 acts against the axial spring 34 in the drive pulley 24, pushing the first and second sheaves 30, 32 apart, so the effective diameter of the drive pulley 24 decreases to lower the tension in the belt 28 to an acceptable level. Conversely, when the load on the alternator 14 decreases, the torque on the rotor shaft 22 decreases, and therefore the effective diameter of the driven pulley 26, 26*a* decreases creating slack in the belt 28. The force of the axial spring 34 is now dominant and biases the first and second sheaves 30, 32 closer together to increase the effective diameter of the drive pulley 24 and take up slack in the belt 28.

Figure 6:
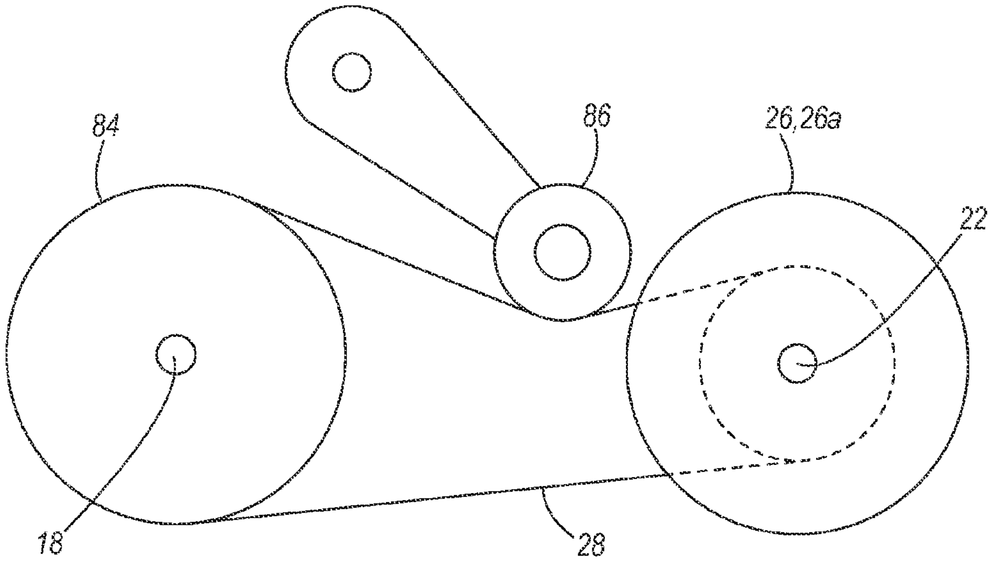
FIG. 6 is a schematic view of a pulley system according to a second embodiment of the invention.

In another construction, a fixed-diameter drive pulley 84 may be employed, as shown in FIG. 6, instead of the variable-diameter drive pulley 24. In this construction, a belt tensioner 86 is employed to compensate for changes in belt tension. Belt tensioner 86 is preferably a pivoting swing arm type tensioner, as shown. As described above, an electrical or mechanical governor may be employed. In this construction, however, a mechanical governor may additionally employ a control linkage from the belt tensioner 86 to the throttle valve to control the engine speed based on rotor shaft torque.

The effect that the relationship between the drive and the driven pulleys 24, 26, 26*a* of the illustrated constructions has on transmission ratio should also be noted. In the illustrated construction, the drive pulley 24 is generally larger in effective diameter than the driven pulley 26, 26*a* as shown by an instantaneous effective diameter C of the drive pulley and an instantaneous effective diameter D of the driven pulley in FIG. 4. In a preferred construction, the CVT pulley system 16 has a step-up ratio of 1.5 when the load is minimal. Therefore, for each revolution of the drive shaft 18, there are 1.5 revolutions of the rotor shaft 22. When the torque (i.e., load) on the alternator 14 increases, the effective diameter of the driven pulley 26, 26*a* increases and the effective diameter of the drive pulley 24 decreases to maintain proper belt tension. In the preferred construction, the CVT pulley system 16 will shift progressively to a 1.111 speed reduction ratio as the load increases. Therefore, for each revolution of the drive shaft 18 at increased torque, there are fewer revolutions of the rotor shaft 22 than at a lower torque. The increase of torque therefore results in a decrease of rotor speed. The governor 19 then signals for an increase in engine speed in order to return the rotor shaft 22 to the target rotor speed. Conversely, when the torque on the alternator 14 decreases, the effective diameter of the driven pulley 26, 26*a* decreases and the effective diameter of the drive pulley 24 increases to maintain proper belt tension. Therefore, for each revolution of the drive shaft 18 at decreased torque, there are more revolutions of the rotor shaft 22 than at a higher torque. The decrease of torque therefore results in an increase of rotor speed. The governor 19 then signals for a decrease in engine speed in order to return the rotor shaft 22 to the target rotor speed. Thus, the generator 10 operates to maintain a substantially constant rotor speed, which provides a steady supply of alternating current for power-consuming devices. In other constructions, other transmission ratios may be employed to achieve other desired results.

Figure 7:
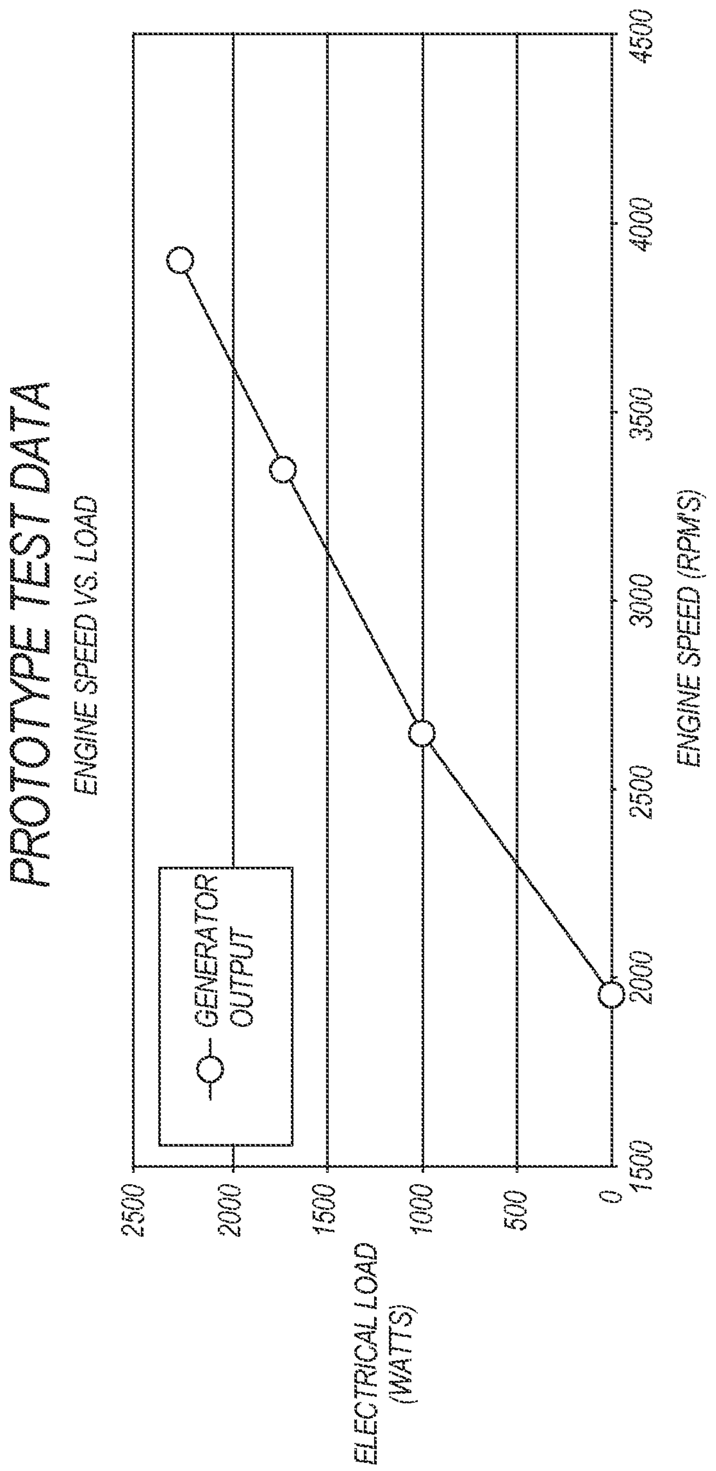
FIG. 7 is a plot of test data corresponding to a prototype of the first embodiment of the invention.

The relationship between load (i.e., torque on the rotor shaft 22) and engine speed, as described above, is confirmed by the test data. That is, engine speed decreases with decreasing loads and increases with increasing loads. FIG. 7 is a plot test data from a prototype of the generator 10 showing engine speed vs. load. The engine runs at a speed of approximately 3900 rpm for an electrical load of approximately 2300 watts, at a speed of approximately 3400 rpm for an electrical load of approximately 1700 watts, at a speed of approximately 2700 rpm for an electrical load of approximately 1000 watts, and at idle speed (approximately 1900 rpm) for substantially no electrical load. As shown, the engine speed is significantly less than 3600 rpm for lower electrical loads, which saves fuel and is more efficient than a direct drive system.

The generator 10 also provides quieter operation, lower exhaust emissions, reduced engine wear, and improved fuel economy over typical direct drive generators because the engine speed decreases at lower electrical loads.

Thus, the invention provides, among other things, a portable, residential, or small business generator employing a CVT pulley system.

What is claimed is:

1. A generator system comprising:

a prime mover having a drive shaft and a throttle;

a driven member having a rotor disposed on a rotor shaft; and a continuously variable transmission pulley system comprising a drive pulley coupled to the drive shaft and having a variable drive pulley effective diameter, a driven pulley coupled to the rotor shaft and having a variable driven pulley effective diameter, the variable driven pulley effective diameter varying in response to varying torque on the rotor shaft, and a belt configured to engage the drive pulley and the driven pulley and having a belt tension, wherein the drive pulley effective diameter varies in response to the belt tension.

2. The generator system of claim 1, wherein the driven pulley comprises:

a first sheave having a first surface configured to engage the belt; and a second sheave having a second surface configured to engage the belt, wherein at least one of the first sheave and the second sheave include a cam surface configured such that the second sheave is moveable axially and rotatably with respect to the first sheave in response to a torque on the rotor shaft.

3. The generator system of claim 2, further comprising a compression spring configured to bias the second sheave toward the first sheave.

4. The generator system of claim 2, further comprising a torsional spring configured to bias the second sheave toward the first sheave.

5. The generator system of claim 2, wherein the drive pulley comprises:

a third sheave having a third surface configured to engage the belt; and a fourth sheave configured to move axially relative to the drive shaft, the fourth sheave having a fourth surface configured to engage the belt.

6. The generator system of claim 5, further comprising a second spring configured to bias the fourth sheave toward the third sheave.

7. The generator system of claim 1, further comprising a belt tensioner configured to engage the belt to maintain a predetermined tension of the belt.

8. A generator system comprising:

a prime mover having a drive shaft and a throttle;

a driven member having a rotor disposed on a rotor shaft;

a continuously variable transmission pulley system comprising a drive pulley coupled to the drive shaft and having a variable drive pulley effective diameter, a driven pulley coupled to the rotor shaft and having a variable driven pulley effective diameter, the variable driven pulley effective diameter varying in response to varying torque on the rotor shaft, and a belt configured to engage the drive pulley and the driven pulley; and a governor configured to adjust the throttle to control the speed of the prime mover in response to a speed of the rotor shaft.

9. The generator system of claim 8, wherein the driven pulley comprises:

a first sheave having a first surface configured to engage the belt; and a second sheave having a second surface configured to engage the belt, wherein at least one of the first sheave and the second sheave include a cam surface configured such that the second sheave is moveable axially and rotatably with respect to the first sheave in response to a torque on the rotor shaft.

10. The generator system of claim 9, further comprising a compression spring configured to bias the second sheave toward the first sheave.

11. The generator system of claim 9, further comprising a torsional spring configured to bias the second sheave toward the first sheave.

12. The generator system of claim 9, wherein the drive pulley comprises:

a third sheave having a third surface configured to engage the belt; and a fourth sheave configured to move axially relative to the drive shaft, the fourth sheave having a fourth surface configured to engage the belt.

13. The generator system of claim 12, further comprising a second spring configured to bias the fourth sheave toward the third sheave.

14. The generator system of claim 8, further comprising a belt tensioner configured to engage the belt to maintain a proper tension of the belt.

15. The generator system of claim 8, wherein the belt has a belt tension, and further wherein the drive pulley effective diameter varies in response to the belt tension.

16. A method of controlling the operation of a generator having a driven shaft, the method comprising:

coupling a driven pulley to the driven shaft, the driven pulley having a driven pulley variable effective diameter;

providing a prime mover having a drive shaft;

coupling a drive pulley to the drive shaft, the drive pulley having a drive pulley variable effective diameter;

engaging a belt with the drive pulley and the driven pulley such that the driven shaft rotates in response to rotation of the drive shaft, the belt having a belt tension;

adjusting the effective diameter of the driven pulley in response to varying torque on the driven shaft; and adjusting the effective diameter of the drive pulley in response to variations in the belt tension.

17. The method of claim 16, further comprising:

sensing the rotational speed of the driven shaft; and adjusting a throttle position of the prime mover to change the speed of the prime mover based on the sensed rotational speed.

18. The method of claim 16, further comprising controlling the belt tension with a belt tensioner that engages the belt between the drive pulley and the driven pulley.

19. The method of claim 16, further comprising biasing the drive pulley toward a large diameter position.

20. The method of claim 19, further comprising biasing the driven pulley toward a large diameter position.

* * * * *